United States Patent [19]

Larson et al.

[11] Patent Number: 4,638,017

[45] Date of Patent: Jan. 20, 1987

[54] HYDROPHILIC POLYURETHANE/POLYUREA SPONGE

[75] Inventors: Wayne K. Larson; Steven T. Hedrick, both of Maplewood, Minn.

[73] Assignee: Minnesota Mining and Manufacturing Company, St. Paul, Minn.

[21] Appl. No.: 806,758

[22] Filed: Dec. 9, 1985

[51] Int. Cl.$^4$ .............................................. C08G 18/14
[52] U.S. Cl. ...................................... 521/157; 521/172
[58] Field of Search ................................ 521/157, 172

[56] References Cited

U.S. PATENT DOCUMENTS

| 3,904,557 | 9/1975 | Guthrie et al. | 521/99 |
| 3,988,268 | 10/1976 | Dietrich et al. | 260/2.5 |
| 4,160,076 | 7/1979 | Guthrie et al. | 521/159 |
| 4,307,219 | 12/1981 | Larson | 528/71 |
| 4,323,656 | 4/1982 | Strickman et al. | 521/125 |
| 4,377,645 | 3/1983 | Guthrie et al. | 521/137 |
| 4,384,050 | 5/1983 | Guthrie | 521/127 |
| 4,384,051 | 5/1983 | Guthrie | 521/137 |
| 4,503,198 | 3/1985 | Miyai et al. | 528/71 |
| 4,558,149 | 12/1985 | Larson | 526/258 |

FOREIGN PATENT DOCUMENTS 1483687 10/1975 United Kingdom .

OTHER PUBLICATIONS

U.S.S.N. 562,459, U.S.S.N. 739,542, (copies not included).

Primary Examiner—Maurice J. Welsh
Attorney, Agent, or Firm—Donald M. Sell; James A. Smith; Lorraine R. Sherman

[57] ABSTRACT

A water-absorbing sponge comprises at least one of a sulfo- group containing polyurea and polyurethane, the polymer containing at least one sulfonate equivalent per 20,000 molecular weight units.

15 Claims, No Drawings

HYDROPHILIC POLYURETHANE/POLYUREA SPONGE

TECHNICAL FIELD

This invention relates to a hydrophilic polyurethane/polyurea sponge and a process therefor. The synthetic sponge is useful in home and industrial cleaning applications.

BACKGROUND ART

Cellulose sponges are in wide use for many cleaning applications. The process for providing cellulose sponges is environmentally disadvantageous due to toxic gaseous and liquid by-products.

Polyurethane sponge materials have been known and utilized for a long time. Most of these sponges are synthesized from isocyanate terminated polyethyleneoxide, polypropyleneoxide, polyesters, or combinations thereof. Coreactants are usually polyols or polyamines of similar polymeric backbones. Water is also used as a coreactant which generates a blowing agent (i.e. carbon dioxide) in addition to generating a crosslinked system. The majority of these materials produce a sponge material with little hydrophilic character (moderate bulk hydrophilicity, but poor surface properties), and few of the characteristics associated with a cellulose sponge. Materials which are claimed to be hydrophilic usually contain a sacrificial hydrophilic compound or have excessive swell (in excess of 50%).

Isocyanate terminated sulfopolyethyleneoxide prepolymers have been described in U.S. Ser. No. 562,459, now U.S. Pat. No. 4,558,149 and also in its CIP application, U.S. Ser. No. 739,542, filed May 30, 1985. Other sulfonated prepolymers for foam applications are described in U.S. Pat. No. 3,988,268. The use of sulfonated urethanes have otherwise been mainly restricted to the synthesis of water-soluble or water-dispersible materials, e.g. U.K. Pat. No. 1,483,687. Prepolymers based on isocyanate-terminated polyethyleneoxide are described in U.S. Pat. Nos. 4,160,076; 4,384,050; 4,384,051; and 4,377,645.

SUMMARY OF THE INVENTION

Briefly, the present invention provides a water-absorbing sponge comprising at least one of sulfo group-containing polyureas and polyurethanes. Preferably, the polymers contain at least one sulfonate equivalent per 20,000 molecular weight units.

In another aspect, this invention provides a hydrophilic polyurethane/polyurea sponge which is the reaction product of a symmetric isocyanate-terminated sulfopolyurethane comprising in its backbone 1) linear, branched, or cyclic-aliphatic organic groups, 2) linear aliphatic ether groups, 3) a central arenepolyyl or alkanepolyyl group containing a pendant sulfonate group, and is end-capped with isocyanate groups, and coreactants which include either 1) water and/or 2) a polyol or a polyamine plus a blowing agent.

In many applications it is desirable for a sponge to resist excessive shrinkage upon drying. In particular, sponges which are laminated to abrasive scrubbing pads, which are commonly used for household and industrial cleaning, become unattractive and in some instances undergo adhesive failure of the laminate upon drying. Large variations in volume between the swollen and dry state of a sponge can be detrimental in such applications.

The sponges of the instant invention, surprisingly, are superior to cellulose-based sponges in that upon drying they exhibit considerably less shrinkage, i.e., 30%, 40%, or even up to 50% less shrinkage compared to cellulose-based sponges. The total water absorption and rate of water take-up is at least as good or better than cellulose-based sponges. Further, the dry-wipe capability of the sponges of the instant invention is equal to that of cellulose-based sponges and is superior to that of natural sponges and known polyurethane sponges.

The preferred article of the invention has open cells which range in size from 3.0 cm to less than 1.0 micrometer, preferably 1.0 cm to less than 1.0 micrometer, has a dry density in the range of 0.03 to 0.1 g/cm$^3$ and preferably has a volumetric swell in water of less than 30%. The sponge is equal to or improves upon existing cellulose derived sponges in the following areas of performance: dry wipe, rate of water absorption, percent swell in water (reduced shrinkage upon drying), tensile strength, and toughness.

In this application "sponge" means a porous, open-cellular mass capable of absorbing liquids, and is elastic and flexible when damp;

"flexible" means can be bent through an angle of 180° without cracking or breaking;

"dry wipe" means the ability of a damp sponge to remove water from a surface;

"isocyanate-terminated sulfopolyurethane" means a symmetrical compound having in its backbone linear, branched, or cyclic-aliphatic organic groups, linear aliphatic groups which can be interrupted by nonperoxidic oxygen atoms or ester groups, a central arenepolyyl or alkanepolyyl group containing of which at least one is a pendant sulfonate salt group, and is end-capped with isocyanate groups;

"lower alkyl" means 1 to 4 carbon atoms;

"pendant" means suspended from the main chain (backbone) of the polymer;

"catenary" means in the main chain or backbone and not in a pendant or terminal group;

"sulfo" means a -SO$_3$H group or a salt thereof;

"sulfocompound" means a compound containing a pendant sulfo group; and

"plurality" means a number of three or more.

DETAILED DESCRIPTION

The present invention provides a sponge comprising a plurality of units having the formula

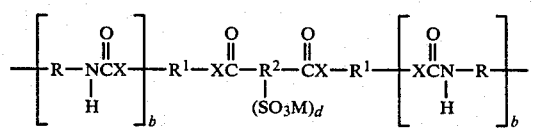

and a plurality of units selected from urea units,

, biuret units,

-continued

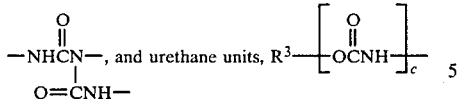

wherein

R is an organic group having a valence of a +1 selected from linear and branched aliphatic groups having 2 to 12 carbon atoms, 5- and 6-membered aliphatic and aromatic carbocyclic groups having 5 to 50 carbon atoms;

$R^1$ is a linear aliphatic group having a valence of (b+1) that is the residue of a polyether, polyester, or polyamide polyol or polyamine having the formula $$HXR^1X(XH)_b$$

the aliphatic group condisting of a saturated chain of up to about 110 carbon atoms in units of 2 to 12 —$CH_2$—groups which can be separated individual oxygen atoms,

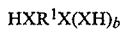

groups, the aliphatic group having a molecular weight of up to about 2000, wherein b is an integer of 1, 2, 3; $R^2$ is an arenepolyyl group (polyvalent arene group) having a valence of d+2 having 6 to 20 carbon atoms or an alkanepolyyl (polyvalent alkane) group having 2 to 20 carbon atoms remaining after the removal of d sulfo groups from sulfoarene- and sulfoalkane dicarboxylic acids having the formula

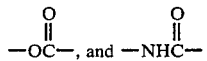
VIII in which M is a cation, and preferably M is at least one of Na, but M can be H, an alkali metal ion such as K or Li, an alkaline earth metal cation (e.g., Mg, Ca, or Ba), or a primary, seconday, tertiary, or quaternary ammonium cation such as ammonium, methylammonium, butylammonium, diethylammonium, triethylammonium, tetraethylammonium, and benzyltrimethylammonium cation, and d is a number having a value of 1, 2, or 3;

$R^3$ is a linear or branched aliphatic group having 2 to 50 carbon atoms and a valence of c in which c is a number having a value of 2 to 5, the group optionally containing 1 to 20 of at least one of non-peroxidic oxygen atom,

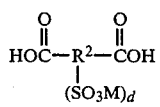

groups, or $R^3$ is a 5- or 6-membered cycloaliphatic group or aromatic group having 5 to 20 carbon atoms; and X is independently —O— or —NH—.

The sponge of the invention which comprises a polymeric 3-dimensional network and has an absorptive capacity of 10 to 50, preferably 10 to 30 grams of water per gram of dry sponge, and a rate of water absorption of 0.001 to 0.04 g/cm$^2$/5 seconds, a density in the range of 0.01 to 0.4 g/cm$^3$, preferably 0.03 to 0.1 g/cm$^3$, and a percentage volumetric swell in water of less than 50%, preferably less than 30%, and most preferably 15 to 25%, and wet wipe capacity of 90 to 95%, and as noted above, has additional properties equal or better than those of cellulose and natural sponges. The sponge of the invention can be prepared by a process that is simpler than the process for preparing cellulose sponges, and does not produce large quantities of environmentally damaging by-products.

In the process of the invention the polyurethane/polyurea sponge is provided by the reaction of
1. about 1 equivalent of an isocyanate-terminated sulfopolyurethane which is described in detail in assignee's copending patent application U.S. Ser. No. 739,542, which is a CIP of U.S. Pat. No. 4,558,149, to be issued Dec. 10, 1985, and which has the formula

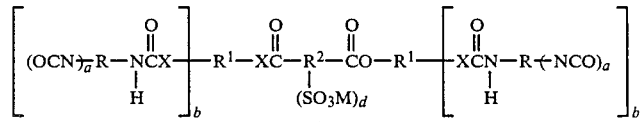

wherein R, $R^1$, $R^2$, X, M, b and d are as defined above, and a is a number having a value 1, 2, or 3, and which preferably has a molecular weight in the range of 300 to 5,000 with
2. a coreactant which can include at least one of
   (a) 5 to 50 moles of water, and
   (b) about 0.8 to 1.2 moles of a polyol and/or 0.05 to 1.5 moles of a polyamine plus a blowing agent.

The process of the invention is depicted in the FLOW CHART below wherein R, $R^1$, $R^2$, $R^3$, X, M, a, b, c and d are as defined above.

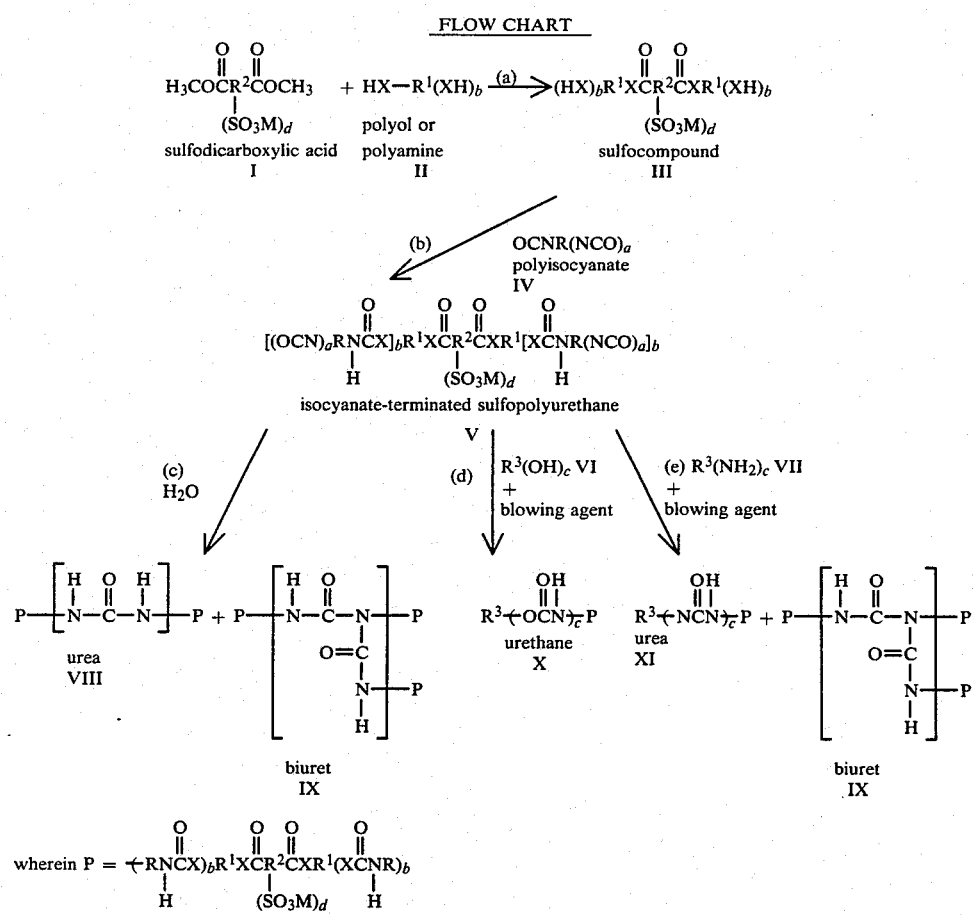

FLOW CHART isocyanate-terminated sulfopolyurethane V

Steps (a) and (b) which provide the isocyanate-terminated sulfopolyurethane/urea of Formula V has been described in U.S. Ser. No. 739,542. Preferably, it is prepared by the reaction of one mole of sulfoarene or sulfoalkane dicarboxylic acid, Formula I, (or their esters prepared from an alcohol of low molecular weight, i.e. below about 94, their acid anhydrides, or their acid halides) with two moles of aliphatic monomeric or polymeric polyol or polyamine of Formula II having (b +1) groups selected from amino and hydroxyl groups forming a sulfopolyol or sulfopolyamine designated a sulfocompound having 2 hydroxyl and/or amino groups, wherein b is an integer of 1, 2, or 3. The sulfocompound (Formula III) is then caused to react with 2b moles of an organic polyisocyanate to form an isocyanate-terminated sulfocompound. As is known in the art, these reactions can be performed in the presence of a mercury, lead or tin catalyst such as dibutyltin dilaurate. Preferably, the catalyst is a tertiary amine, tricalcium aluminate, or the potassium salt of a molybdenum ester of triethyleneglycol as is disclosed in U.S. Pat. No. 2,916,464. The preparation of the sulfocompound can be carried out by heating the reactants for about 2 to 20 hours, preferably 4 to 10 hours, at temperatures from 150 to 300° C., preferably 200° to 250° C., under reduced pressure or an inert atmosphere.

Aliphatic polyols, $(HO)_b R^1 OH$ of Formula II, useful in preparing the polyurethane/polyurea sponges of the invention have a molecular weight of 62 up to 2000 and include, for example, monomeric and polymeric polyols having two to four hydroxyl groups. Examples of the monomeric polyols include ethylene glycol, propylene glycol, butylene glycol, hexamethylene glycol, cyclohexamethylenediol 1,1,1-trimethylolpropane, pentaerythritol, and the like. Examples of polymeric polyols include the polyoxyalkylene polyols (i.e., the diols, triols, and tetrols), the polyester diols, triols, and tetrols of organic dicarboxylic acids and polyhydric alcohols, and the polylactone diols, triols, and tetrols having a molecular weight of 106 to about 2000. Examples of polymeric polyols include polyoxyethylene diols, triols and tetrols such as the Carbowax ™ polyols available from Union Carbide, Danbury, Conn, the polyoxytetramethylenediols such as Polymeg ™ polyols available from Quaker Oats Company, Chicago, IL, the polyester polyols such as the Multron ™ poly(ethyleneadipate)-polyols available from Mobay Chemical Company, and the polycaprolactone polyols such as the PCP ™ polyols available from Union Carbide.

Aliphatic polyamines of Formula II have a molecular weight of 60 to 2000 and include monomeric and polymeric primary and secondary aliphatic amines having two to four amino groups. Examples include alkylene diamines such as ethylenediamine, triethylenetetraamine, diethylenetriamine, piperazine, as well as other aliphatic polyamines such as the polyamines available from Jefferson Chemical Co., Inc., a subsidiary of Texaco, Inc., under the trade name Jeffamine ™ such as Jeffamine ™ D-400, a polyoxypropylene diamine having a molecular weight of about 400; Jeffamine ™ D-230, a polyoxypropylene diamine having a molecular weight of about 230; Jeffamine TM T-403, a polyoxypropylene triamine having a molecular weight of about 400; and Jeffamine TM ED 600 and ED 900, which are polyoxyethylene diamines having molecular weights of 600 to 900, respectively. In addition, hydrazino comounds such as adipic dihydrazide or ethylene dihydrazine can be used, as can also, alkanolamines such as ethanolamine, diethanolamine, and tris(hydroxyethy)ethylenediamine. The polymeric polyols and polyamines that have a molecular weight of about 300 to 1000 are preferred.

Sulfoarene- and sulfoalkanedicarboxylic acids of Formula I useful for preparation of the polyurethane/polyurea sponges of the invention are any of the known sulfoarene- and sulfoalkanedicarboxylic acids. Examples of these include sulfoalkanedicarboxylic acids such as sulfosuccinic acid, 2-sulfoglutaric acid, 2,5-disulfoadipic acid, 2-sulfododecanedioic acid, sulfoarenedicarboxylic acids such as 5-sulfonaphthalene-1,4-dicarboxylic acid, 4,5-disulfonaphthalene-1,8-dicarboxylic acid, sulfobenzylmalonic acids such as those described in U.S. Pat. No. 3,821,281; and sulfofluorenedicarboxylic acids such as 9,9-di(2'-carboxyethyl)fluorene-2-sulfonic acid described in British Pat. No. 1,006,579. It is understood that the corresponding lower alkyl esters, halides, anhydrides, and salts of the above sulfonic acids can also be used in the preparation.

Polyisocyanates, Formula IV, that can be used to react with the sulfocompounds, Formula III, to form the isocyanate-terminated sulfocompounds that are intermediates to the polyurethane/polyurea sponges of the invention are any of the well-known polyisocyanates. Preferred polyisocyanates are hexamethylene diisocyanate, toluene diisocyanate, isophorone diisocyanate, 3,5,5-trimethyl-1-isocyanato-3-isocyanatomethyl-cyclohexane, 4,4'-diphenylmethane diisocyanate (MDI), 4,4,4''-triisocyanatotriphenylmethane, and the polymethylenepolyphenylisocyanates. Other polyisocyanates are well known and include those described in U.S. Pat. Nos. 3,700,643 and 3,600,359 among many others. Mixtures of polyisocyanates can also be used such as the mixture of MDI and trimer of MDI available from Upjohn Polymer Chemicals as Isonate 143L TM "Liquid MDI".

The polyurethane/polyurea sponges of the invention can be provided by any of steps (c), (d), and (e). In step (c), about 1 equivalent of isocyanate-terminated sulfocompound of Formula V is admixed with 5 to 50 moles of water. Preferably, 0.01 to 5.0 weight percent of a surfactant such as a nonionic alkylphenyl polyether alcohol (Pluronic L-64 TM, BASF Wyandotte Corp, Parsippany, N.J.) and 0.01 to 1.0 weight percent of a catalyst such as N-ethylmorpholine (Texaco Chemical Co.) is added. Other useful catalysts include tin catalysts or urethane catalysts such as those available as DABCO TM (Air Products and Chemicals, Inc., Allentown, Pa.). Although a catalyst can be used in step (e), one generally is not needed. The catalyst preferably is added with the water, before admixing with the isocyanate-terminated sulfopolyurethane, to accelerate cross-linking of the resin and $CO_2$ evolution and to provide lower density and a more open structured sponge. Useful blowing agents include any gas or volatile organic compound that dissolves in the compound of Formula V, such as trichlorofluoromethane (Freon-113 TM, Dupont de Nemours Co., Wilmington, DE). The reaction mixture is subjected to high speed mechanical stirring, preferably for 20 to 30 seconds at about 800 rpm at ambient conditions, and then it is immediately poured into a flat vessel, whereupon an expansion of the resin takes place. In this expansion of the resin, carbon dioxide gas is released in a chemical reaction which causes a porous, open-cellular mass to form. The resulting sponge is trimmed to remove the outer skin and then is oven-cured at low temperatures (35 to 80° C., preferably about 50° C.) for 0.5 to 6 hours, preferably about 2 hours.

If the sponge is prepared via step (c) it can be one or more than one 3-dimensional crosslinked molecule having a plurality of units

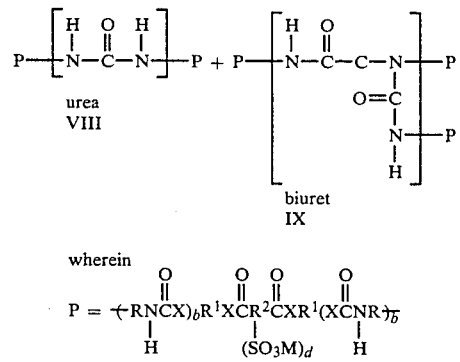

wherein $$P = +(RNCX)_b R^1 XCR^2 CXR^1 (XCNR)_{\overline{b}} \atop H \quad\quad (SO_3M)_d \quad H$$

with C=O groups shown $R$, $R^1$, $R^2$, $M$, $X$, $b$ and $d$ are as defined above.

If the sponge is prepared via steps (d) or (e), the procedure is modified as follows:

To about 1 mole of the isocyanate-terminated sulfopolyurethane of Formula V, 0.8 to 1.2 moles of a polyol $R^3(OH)_c$ (Formula VI) or 0.5 to 1.5 moles of a polyamine $R^3(NH_2)_c$ (Formula VII) is added 1 to 20 weight percent (preferably 5 to 15 weight percent) of a blowing agent. The blowing agent is admixed using the procedure as for step (c). The reaction of step (d) preferably includes a catalyst and amount as described in step (b). Step (e) generally requires no catalyst. In steps (d) or (e) it may be advantageous to use an amount of water in addition to or instead of the blowing agent, i.e., 0.01 to 40.0 weight percent, to be added to the polyol or polyamine to augment or supply the necessary blowing agent.

Polyols, $R^3(OH)_c$, and polyamines, $R^3(NH_2)_c$ that can be used in steps (d) and (e) preferably are the aliphatic polyols and polyamines of Formula II. Aromatic polyamines such as 1,2-, 1,3-, and 1,4-phenylenediamine, toluenediamine and the like can be used in amounts (generally up to about 50% by weight). The sulfopolyols of Formula III can also be used in step (d).

In steps (c), (d), and (e) the product may comprise a mixture of polyurea (VIII) and/or (XI), polyurethane (X), and biuret units (IX).

A blowing agent is useful with the polyamine or polyol of reaction steps (d) or (e) in preparing the sponge of the invention. Useful blowing agents include $C_1$ to $C_8$ hydrocarbons, $C_1$ and $C_2$ chlorinated hydrocarbons such as methylene chloride, dichloroethene, monofluorotrichloro-methane (Freon 113 TM, Dupont), difluorodichloromethane, acetone, as well as nonreactive gases such as carbon dioxide, nitrogen, or air.

As is known in the art, there can be incorporated in the sponges during their preparation various adjuvants such as fillers and fibers (e.g., nylon, rayon, cellulose, polypropylene, diatomaceous clays and other inorganic fillers), deodorants, medicinals, or insecticides.

The polyurethane/polyurea sponges of the present invention exhibit water absorption rates equal to or better than cellulose sponges of comparable density, equivalent absorption capacity to cellulose sponges, and have dramatically reduced swell, i.e., swell in volume of less than 30% while cellulose sponges swell up to 60% or more. The sponges of the present invention find use in home and industrial applications including in nonwoven sponge laminates (e.g., comprising Scotchbrite TM sponge laminates, 3M, St. Paul, Min.), sponge laminates to fabrics, synthetic chamois, personal care, and medical products.

In the Examples below the following test methods were used:

1. Procedure for Measurement of Percent Swell

A sponge sample approximately 5 cm × 5 cm × 0.6 cm was oven dried at 64° C. for 6 hours. The length, width, and thickness of the sponge were measured in order to calculate the dry volume. The sponge was then thoroughly saturated with water (approximately 1 hour soaking in water to permit total possible swell), wrung out, and the dimensions measured in order to calculate wet volume. The percent volume change (percent swell) was calculated by $$\frac{V_{wet} - V_{dry}}{V_{dry}} \times 100 = \text{percent swell}$$

2. Procedure for Measurement of Rate of Absorption

A sponge sample of approximately 5 cm × 5 cm × 0.6 cm was prepared by soaking in water for 1 hour prior to testing. The sponge was wrung out, weighed, and the length and width of this sponge were then measured. Rate of water absorption was measured in a water container equipped with a perforated metal plate placed 3 mm below the water overflow level. Water was held constant at this level by a constant flow into the container; water was maintained at room temperature (21° C.).

In order to measure rate, the sponge was placed on the surface of the perforated plate such that the measured area was in contact with the plate, and held in this position for exactly five seconds. The sponge was removed and weighed immediately to measure the amount of water absorbed. Rate of water absorption was then calculated by $$\text{rate of absorption} = \frac{\text{net weight of water absorbed in 5 seconds}}{\text{cross sectional area}}$$

3. Procedure for Measuring Wet Wipe

A dry sponge was cut to provide a sample having the dimensions 7.6 cm × 10.2 cm × 1.3 cm and squeezed under water at 21° C. to remove air. The sample was then squeezed in air using a rubber roller wringer to remove excess water. The sponge was then weighed and the weight was recorded as $M_1$. Twenty grams of distilled water were poured onto the surface of a clean glass mirror and without applying pressure, the wrung out sponge sample was passed in five back and forth motions through the water. The sponge was then reweighed and the weight recorded as $M_2$.

$$\text{percent wiping capacity} = \frac{M_2 - M_1}{20} \times 100$$

Objects and advantages of this invention are further illustrated by the following examples, but the particular materials and amounts thereof recited in these examples, as well as other conditions and details, should not be construed to unduly limit this invention.

EXAMPLE 1—sulfocompound synthesis (step a)

A one liter flask was fitted with a mechanical stirrer, nitrogen purge, condenser and receiver for condensate. The flask was charged with 1.0 moles (600 g) ethyleneoxide polyol (Carbowax 600 TM, Union Carbide, Danbury, Conn.), 0.25 moles (24.0 g) dimethyl sodium 5-sulfoisophthalate (previously dried above 100 degrees C. in a vacuum oven), and 100 g toluene. The flask was heated in a Woods metal bath to 130° C. to distill toluene and thus dry the reactants. When all of the toluene was removed the reactants were heated to 200° C. at which time 0.2 g $Zn(OAc)_2$ is added (0.03 wt %). Esterification accompanied by the evolution of methanol took place. The temperature was raised to 245° C. for a period of 4 hours, at which time the pressure was reduced to 1 mm for 30 to 60 minutes. Hot resin was the poured into dry containers and capped under dry $N_2$ to prevent absorption of water. The OH equivalence of this diol was typically approximately 465 g/mole OH as determined by the NCO method.

EXAMPLE 2—isocyanate endcapping reaction (step b)

A two-liter flask was fitted with mechanical stirrer, addition funnel, dry nitrogen purge, and oil bath heating. The flask was charged with 500.0 g of a mixture of 4,4,'-diphenylmethane diisocyanate-based polyisocyanates (Isonate 143L TM, Upjohn, Kalamazoo, Mich.), and 0.58 g (0.05 wt %) ethanesulfonic acid (this acid was introduced slowly with rapid stirring). The temperature of this mixture was raised to 60° C., at which time the addition of 465.0 g of the sulfodiol prepared as in Example 1 was begun; the addition lasted approximately one hour, at a rate allowing a maximum exotherm of 80° C. When addition was complete the reaction was held at 70° C. for 2 hours, at which time the resin was poured into predried containers under dry $N_2$. An isocyanate-terminated sulfopolyurethane having a typical NCO equivalent of 385 g/mole NCO was found to be present.

EXAMPLE 3—sponge forming reaction 70.0 g of the isocyanate-terminated sulfopolyurethane prepared as in Example 2 was weighed into a 500 ml plastic beaker. In a separate 50 ml beaker 30 g of water was mixed with 0.35 g nonionic alkylphenyl polyether alcohol surfactant (Pluronic L-64 TM) 0.53 g N-ethylmorpholine, and a water soluble dye (if desired). The two were mixed together with a high speed mechanical stirrer for 20 to 30 seconds at about 800 rpm, and then immediately poured into an aluminum pan before significant expansion of the resin occurred. $CO_2$ was released in a chemical reaction and caused a porous, open cellular mass to form. The resulting sponge was trimmed to remove the outer skin and it was then oven cured at 50° C. for 2 hours. Performance of the resulting sponge designated 3A will be described in Example 4.

This example was repeated except that the mixing of the components with the high speed stirrer was for 30 to 40 seconds to provide a sponge designated 3B.

This example was repeated except that the mixing of the components with the high speed stirrer was for 10 to 20 seconds to provide a sponge designated 3C.

EXAMPLE 4

Sponges of three different chemical compositions, some having similar densities, were evaluated for water absorption properties. The data is shown in TABLE I below.

TABLE I

Properties of Sponges

| | Density | Rate[c] | % Swell | Dry Wipe |
|---|---|---|---|---|
| Hypol-4000 TM [a] | 0.0400 | .002 | 40–60 | 45–50% |
| Cellulose[b] | 0.0450 | .017 | 30–60 | 90–95% |
| Sponge 3A of Example 3 | 0.0400 | .017 | 15–25 | 90–95% |
| Sponge 3B of Example 3 | 0.0350 | .018 | 15–25 | — |
| Sponge 3C of Example 3 | 0.0835 | .014 | 15–25 | — |

[a] non-ionic sponges based on polyethyleneoxide prepolymer available from W.R. Grace.
[b] Scotch Brite$^R$ Kitchen scrub-sponge TM (3M, St. Paul, MN)
[c] rate of water absorption in g/cm$^2$ per 5 seconds The data of TABLE I shows that the rate of water absorption and wet wipe of non-ionic sponges are low (0.002 g/cm$^2$ sec and 45 to 90% respectively) relative to cellulose sponges and the sponges of Example 3 (0.017 g/cm$^2$ sec and 90–95% respectively) and that the percentage swell of the sponges of Example 3 (15–25%) is dramatically lower than that of the non-ionic sponges (40–60%) and cellulose sponges (30–60%).

EXAMPLE 5

A one liter flask equipped as described in Example 6 was charged with 1.67 moles (250.0 g) triethylene glycol (Aldrich), 1.11 moles (162.2 g) dimethyladipate (Aldrich), and 100 g toluene. The flask was heated in the Woods metal bath to 140° C. to distill toluene and thus dry the reactants. There was then added 0.10 g zinc acetate. Heating was continued to a temperature of 200° C. Evolution of methanol took place indicating esterification of the triethylene glycol with adipic acid. There was then added 0.28 moles (82.2 g) dimethyl sodium 5-sulfoisophthalate (previously dried in a vacuum oven at 100° C.) and 0.05 g zinc acetate. The temperature of the flask contents was then elevated to 250° C. and held for a period of 5 hours. The pressure in the flask was then reduced to 1 mm for one hour to remove volatiles. Sulfopolyesterdiols obtained by this process typically had an hydroxyl equivalent weight of about 700 as determined by isocyanate titration.

The sulfopolyesterdiol, as obtained above (350 g) was isocyanate endcapped by reaction with 250 g of Isonate 143 L in accordance with the procedure of Example 2. An isocyanate-terminated sulfopolyesterpoly-urethane was obtained having an isocyanate equivalent weight of 580 was obtained.

A sponge prepared in accordance with the procedure of Example 3 using the above isocyanate-terminated sulfopolyesterpolyol had characteristics similar to those of the sponge of Example 3.

EXAMPLES 6–15

Sponges were prepared by the reaction according to the procedure described in Example 3 using the materials shown in Column A, as indicated in TABLE II. The isocyanate-terminated sulfocompound in Column A was prepared according to the procedure described in Example 2 using the moles of Isonate 143L TM to one mole of sulfocompound shown in Column B. The sulfocompounds in Column C were prepared according to the procedure described in Example 1 by reaction of one mole of dimethyl sodium isophthalate with the moles of polymeric diol shown in Column C.

TABLE II

| | A SPONGE PREPARATION | | | | B PREPARATION OF ITS[h] | C PREPARATION OF SULFOCOMPOUND | |
|---|---|---|---|---|---|---|---|
| Ex. No. | ITS[h] g | H$_2$O g | Surfactant[f] g | Catalyst[g] g | Mole Ratio[i] | Polyol | Mole Ratio[j] |
| 6 | 70 | 30 | 0.35 | 0.53 | 3.5 | PEO[k] 600 | 4 |
| 7 | 70 | 20 | 0.50 | 0.50 | 3.1 | PEO 400 | 4 |
| 8 | 70 | 24 | 0.40 | 0.70 | 3.5 | PEO 600 and PEO 400 | 2 2 |
| 9 | 70 | 32 | 0 | 0 | 3.3 | PEO 1000 | 4 |
| 10 | 70 | 35 | 0 | 0 | 3.5 | PEO 1000 and PEO 1450 | 2 2 |
| 11 | 70 | 26 | 0 | 0 | 2.5 | PEO 1000 | 4 |
| 12 | 70 | 30 | 0.30 | 0.80 | 3.5 | Polyester diol[l] | 2 |
| 13 | 70 | 30 | 0.35 | 0.70 | 3.5 (chain[m] extended with 5% butanediol) | PEO | 4 |
| 14 | 70 | 30 | 0.35 | 0.70 | 3.5 (chain extended with 10% butanediol) | PEO 600 | 4 |
| 15 | 70 | 30 | 0.40 | 0.70 | 3.5 (chain extended with 5% trio-(hydroxyethyl)- | PEO 600 | 4 |

TABLE II-continued

| | A SPONGE PREPARATION | | | | B PREPARATION OF ITS[h] | C PREPARATION OF SULFOCOMPOUND | |
|---|---|---|---|---|---|---|---|
| Ex. No. | ITS[h] g | H₂O g | Surfactant[f] g | Catalyst[g] g | Mole Ratio[i] | Polyol | Mole Ratio[j] |
| | | | | | isocyanurate | | |

[f] Pluronic L-64
[g] N—ethylmorpholine
[h] isocyanato-terminated sulfocompound
[i] mole ratio of Isonate 143L ™ to sulfocompound
[j] mole ratio of polyol to dimethylsodium 5-sulfoisophthalate
[k] polyethyleneoxy diols, PEO with molecular weight specified, (Carbowax ™, Union Carbide)
[l] prepared as described in Example No. 5
[m] chain extension was done by heating at 60° C. for one hour a mixture of the isocyanate-terminated sulfocompound and the chain extender The sulfocompound-containing sponges prepared as described in Examples 6-15 are hydrophilic and exhibit various densities, rates of water absorption, percentage swell and wet wipe characteristics.

EXAMPLE 16-22

Sponges, as indicated in TABLE III, were prepared in accordance with step (d) by mixing 43 g of the isocyanate-terminated sulfocompound of Example 6 using a high speed mechanical stirrer for 20 to 30 seconds at about 800 rpm with the materials shown, pouring the mixture immediately into an aluminum pan, and placing the foaming mixture into an oven at 100° C. where it is allowed to cure for 30 to 60 seconds and then removed from the oven.

TABLE III

| Ex. No. | ITS[n] g | Curative[u] Polyol | Wt (g) | Surfactant[s] (g) | BLOWING AGENTS Water g | Freon 113 g |
|---|---|---|---|---|---|---|
| 16 | 43 | PCP-0200[p] | (18) | 0.25 | — | 8 |
| 17 | 43 | trimethanolpropane | (3) | 0.25 | 5.0 | 8 |
| 18 | 43 | castor oil | (11) | — | — | 10[t] |
| 19 | 43 | trimethyleneglycol | (7) | 0.20 | — | 10 |
| 20 | 43 | sulfocompound[q] | (23) | 0.25 | — | 10[t] |
| 21 | 43 | butanediol | (3.0) | 0.25 | 5.0 | — |
| 22 | 53[r] | butanediol | (4.5) | — | — | 10 |

[n] isocyanate-terminated sulfocompound of Example 6
[p] polycaprolactonetriol (available from Union Carbide)
[q] the sulfoglycol of Example 7
[r] isocyanate-terminated sulfocompound of Example 9
[s] surfactant was Pluronic L-64
[t] blowing agent was pentane in place of Freon 113
[u] the catalyst used in each composition was 0.1 g dibutyltin dilaurate It is to be observed that hydrophilic sponges prepared using a polyol curative in place of water can be made to have characteristics similar to those prepared using water as the curative for the isocyanate-terminated sulfocompound.

EXAMPLES 23-27

The procedure of Example 16-22 were repeated using as curative polyamines dissolved in water in place of the polyols. The materials used are shown in TABLE IV.

TABLE IV

| Ex. No. | ITS[n] g | Curative Polyamine[v] | Wt (g) | Surfactant[s] g | Catalyst[g] g |
|---|---|---|---|---|---|
| 23 | 43 | Jeffamine D-2000 | 2.0 | — | — |
| 24 | 43 | Jeffamine D-2000 | 5.0 | 0.25 | 0.25 |
| 25 | 43 | Jeffamine D-230 | 1.0 | — | — |
| 26 | 43 | Jeffamine D-230 | 1.0 | 0.25 | 0.25 |
| 27 | 43 | Jeffamine D-600 | 5.0 | 0.25 | 0.25 |

[n] isocyanate-terminated sulfocompound of Example No. 6.
[s] Pluronic L-64
[g] N—ethylmorpholine
[v] dissolved in 15 g water The hydrophilic sponges prepared using polyamines in place of water had characteristics similar to those prepared using polyols as curative. Similar sponges can be made using mixtures of polyols and polyamines as curatives.

Various modifications and alternations of this invention will become apparent to those skilled in the art without departing from the scope and spirit of this invention, and it should be understood that this invention is not to be unduly limited to the illustrative embodiments set forth herein.

I claim:

1. A water-absorbing sponge comprising at least one of a sulfo- group containing polyurea and polyurethane, the polymer containing at least one sulfonate equivalent per 20,000 molecular weight units.

2. The sponge according to claim 1 comprising a plurality of units having the formula

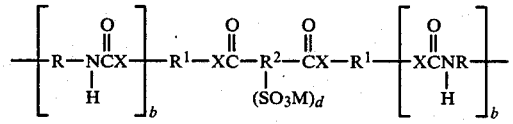

wherein
  R is an organic group having a valence of 2, 3, or 4, selected from linear and branched aliphatic groups having 2 to 12 carbon atoms, 5- and 6-membered aliphatic and aromatic carbocyclic groups having 5 to 50 carbon atoms,
  R¹ is a linear aliphatic group having a valence of (b+1) consisting of a saturated chain of up to 110 carbon atoms in units of 2 to 12 —CH₂— groups which can be separated by individual oxygen atoms,

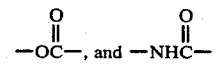

groups, the aliphatic group having a molecular weight of up to 2000, wherein b is an integer of 1, 2, or 3; and $R^2$ has a valence of d+2 and is an arenepolyyl group (polyvalent arene group) having 6 to 20 carbon atoms or an alkanepolyyl (polyvalent alkane) group having 2 to 20 carbon atoms, wherein d is a number 1, 2, or 3, X is independenetly —O— or —NH—, and M is a cation.

3. The sponge according to claim 2 further comprising a plurality of units selected from the group consisting of

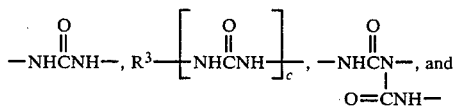

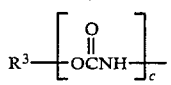

wherein $R^3$ is a linear or branched aliphatic group having 2 to 50 carbon atoms and a valence of c in which c is a number having a value of 2 to 5, the group optionally containing 1 to 20 of at least one of nonperoxidic oxygen atom,

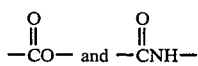

groups or $R^3$ is a 5- or 6-membered cycloaliphatic group or aromatic group having 5 to 20 carbon atoms.

4. A sponge comprising the reaction product of a symmetric isocyanate-terminated sulfopolyurethane comprising in its backbone 1) linear, branched, or cyclioaliphatic organic groups, 2) linear aliphatic ether groups, 3) a central arenepolyyl or alkanepolyyl group containing a pendant sulfonate group, and is end-capped with isocyanate groups, and coreactants which include at least one of 1) water, 2) a polyol plus a blowing agent, and 3) a polyamine plus a blowing agent.

5. A sponge comprising the reaction product of
(a) an isocyanate-terminated sulfopolyurethane having the formula

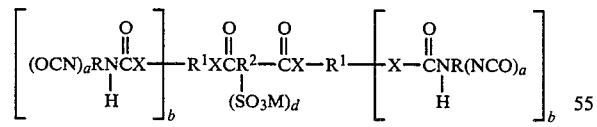

wherein

R is an organic group having a valence of (a +1) selected from linear and branched groups having 2 to 12 carbon atoms, 5- and 6-membered carbocyclic groups having 5 to 50 carbon atoms; a is a number having a value of 1, 2 or 3;

$R^1$ is a linear aliphatic group having a valence of (b +1) consisting of a saturated chain of up to 110 carbon atoms in units of 2 to 12 —CH$_2$— groups which can be separated by individual oxygen atoms,

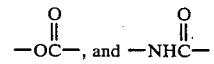

groups, the aliphatic group having a molecular weight of up to 2000, wherein b is an integer of 1, 2, or 3;

$R^2$ has a valence of d+2 and is an arenepolyyl group (polyvalent arene group) having 6 to 20 carbon atoms or an alkanepolyyl (polyvalent alkane) group having 2 to 20 carbon atoms, and d is a number having a value 1, 2, or 3, X is independently -O- or -NH-, M is a cation, and (b) a compound selected from the group consisting of (1) water, and (2) a polyol or a polyamine plus a blowing agent.

6. The sponge according to claim 1 having an absorptive capacity of 10 to 50 grams of water per gram of dry sponge.

7. The sponge according to claim 1 having a rate of water absorption of 0.001 to 0.04 g/cm$^2$/5 sec.

8. The sponge according to claim 1 having a density in the range of 0.01 to 0.4 g/cm$^3$.

9. The sponge according to claim 1 having a percentage volumetric swell in water of 25 to 50%.

10. The sponge according to claim 1 having a percentage volumetric swell in water of less than 30%.

11. The sponge according to claim 2 wherein M is H, an alkali or alkaline earth metal cation, or a primary, secondary, tertiary, or quaternary ammonium cation.

12. The sponge according to claim 1 further comprising adjuvants selected from the class consisting of fibers, fillers, deodorants, medicinals, and insecticides.

13. A method of preparing a sponge-like article comprising the steps of
(a) coreacting
(1) an isocyanate-terminated sulfopolyurethane having the formula

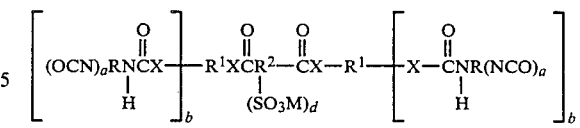

wherein

R is an organic group having a valence of 2, 3, or 4, and is selected from linear and branched groups having 2 to 12 carbon atoms, 5- and 6-membered carbocyclic groups having 5 to 50 carbon atoms, $R^1$ is a linear aliphatic group having a valence of (b+1) consisting of a saturated chain of up to 110 carbon atoms in units of 2 to 12 —CH$_2$— groups which can be separated by individual oxygen atoms,

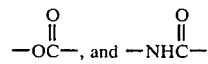

groups, the aliphatic group having a molecular weight of up to 2000, wherein b is an integer of 1, 2, or 3; and $R^2$ has a valence of d+2 is an arenepolyl group (polyvalent arene group) having 6 to 20 carbon atoms or an alkanepolyyl (polyvalent alkane) group having 2 to 20 carbon atoms, wherein d is a number 1, 2, or 3;

X is independenetly —O— or —NH—, and M is a cation;

(2) at least one of
 (a) water, and
 (b) at least one of a polyol or polyamine plus a blowing agent, and (b) isolating the resulting sponge.

14. The method according to claim 13 wherein said polyol or polyamine has the formulas $R^3(OH)_c$ and $R^3(NH_2)_c$
wherein $R^3$ is a linear or branched aliphatic group having 2 to 50 carbon atoms and a valence of c in which c is a number having a value of 2 to 5, the group optionally containing 1 to 20 of at least one of nonperoxidic oxygen atom,

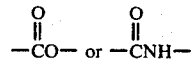

groups, or $R^3$ is a 5- or 6-membered cycloaliphatic group or aromatic group having 5 to 20 carbon atoms.

15. A method of absorbing a liquid comprising the steps of:
 (a) providing a sponge comprising at least one of a sulfogroup-containing polyurea and polyurethane, the polymer containing at least one sulfonate equivalent per 20,000 molecular weight units,
 (b) contacting said sponge to said liquid for a time sufficient for said sponge to absorb all or a portion of said liquid.

* * * * *